United States Patent [19]
Weinhold

[11] Patent Number: 6,050,615
[45] Date of Patent: Apr. 18, 2000

[54] PIPE COUPLING HAVING CLAMP HALVES AND QUICK-ACTION CLOSURE

[76] Inventor: Karl Weinhold, Im Jagdfeld 43, 41464 Neuss, Germany

[21] Appl. No.: 09/082,367

[22] Filed: May 20, 1998

[30] Foreign Application Priority Data

May 31, 1997 [DE] Germany .......................... 197 22 969

[51] Int. Cl.$^7$ .................................................. F16L 37/20
[52] U.S. Cl. ............................ 285/409; 285/410; 24/285
[58] Field of Search ...................................... 285/409, 410, 285/364, 365, 366, 367, 81, 92; 24/279, 285, 20 LS; 292/256.67, 256.71, 256.75; 411/516, 207, 190, 326; 74/526

[56] References Cited

U.S. PATENT DOCUMENTS

| | | | |
|---|---|---|---|
| 1,163,810 | 12/1915 | Darby | 411/326 X |
| 2,121,881 | 6/1938 | Newton | 292/256.67 X |
| 2,283,179 | 5/1942 | Buckingham | 24/279 X |
| 3,866,956 | 2/1975 | Weinhold . | |
| 4,573,717 | 3/1986 | Peacock . | |
| 5,645,303 | 7/1997 | Warehime et al. | 285/409 |
| 5,873,611 | 2/1999 | Munley et al. | 285/410 X |

FOREIGN PATENT DOCUMENTS

| | | | |
|---|---|---|---|
| 2263397 | 6/1974 | Germany . | |
| 1075457 | 7/1967 | United Kingdom | 285/367 |

*Primary Examiner*—Lynne H. Browne
*Assistant Examiner*—Greg Binda
*Attorney, Agent, or Firm*—Proskauer Rose LLP

[57] ABSTRACT

The invention relates to a pipe coupling comprising two clamp halves of C-shaped cross-section connected at one end to pivot in relation to one another around at least one bolt, and a quick-action closure which is disposed at the diametrically opposite other ends of the clamp halves and which comprises a screw bolt, one end of which is articulated to one of the clamp halves and on whose other end a nut drawing the clamp halves into the closure position is placed, a lever lockable in the closure position being articulated to the nut. The characterizing feature of the invention is that the nut bears against a sliding member which is slipped over the screw bolt and which rests with opposite axial pins in corresponding shaped depressions in one clamp half, the lever being locked in the closure position by means of a bowed spring articulated to the other clamp half.

3 Claims, 2 Drawing Sheets

PIPE COUPLING HAVING CLAMP HALVES AND QUICK-ACTION CLOSURE

The invention relates to a pipe coupling comprising two clamp halves of C-shaped cross-section connected at one end to pivot in relation to one another around at least one bolt, and a quick-action closure which is disposed at the diametrically opposite other ends of the clamp halves and which comprises a screw bolt, one end of which is articulated to one of the clamp halves and on whose other end a nut drawing the clamp halves into the closure position is placed, a lever lockable in the closure position being articulated to the nut.

BACKGROUND OF THE INVENTION

Pipe couplings having the features specified hereinbefore are known; DE-OS 22 63 397. The pipe clamps engage positively around the pipe flange connection. They are divided in the centre and comprised two identically shaped halves which are pivotably connected to one another at one end by means of bolts and at the diametrically opposite end are drawn by tensioning means into the closure position.

BRIEF SUMMARY OF THE INVENTION

It is an object of the invention to tension the clamp halves rapidly without pre-adjustment by means of a suitable closure, to close the halves and then to secure the closure against accidental actuation, more particularly against accidental opening.

To solve this problem, using a pipe coupling of the kind specified according to the invention the nut bears against a sliding member which is slipped over the screw bolt and which rests with opposite axial pins in correspondingly shaped depressions in one clamp half, the lever being locked in the closure position by means of a bowed spring articulated to the other clamp half.

The construction of the pipe coupling according to the invention solves the problem stated. The nut can be rapidly rotated into and out of the closure position by means of the lever articulated to the nut. When the closure position has been reached, the lever is tilted over and secured on one clamp half by suitable means, preferably by a bowed spring or a cotter. In this way the lever is secured against accidental actuation with the consequence of the pipe coupling being opened at the wrong time.

In a preferred embodiment of the pipe coupling according to the invention the lever is locked in the closure position resting in a depression formed on one clamp half.

The bowed spring is preferably articulated to the same bearing pin as the screw bolt.

BRIEF DESCRIPTION THE DRAWINGS

In a preferred embodiment of the pipe coupling according to the invention is illustrated in a number of aspects in the drawings as set below:

FIG. 1 depicts a side elevation of a pipe coupling, in accordance with the invention FIG. 2 depicts a cross section, of the pipe coupling FIG. 3 depicts a section, taken along section line 3—3B in FIG. 1, FIG. 4 depicts a section, taken along the line 4—4 in FIG. 1, FIG. 5 depicts elevation '5' and FIG. 6 depicts elevation '6'.

DETAILED DESCRIPTION OF THE INVENTION

Figure 1:
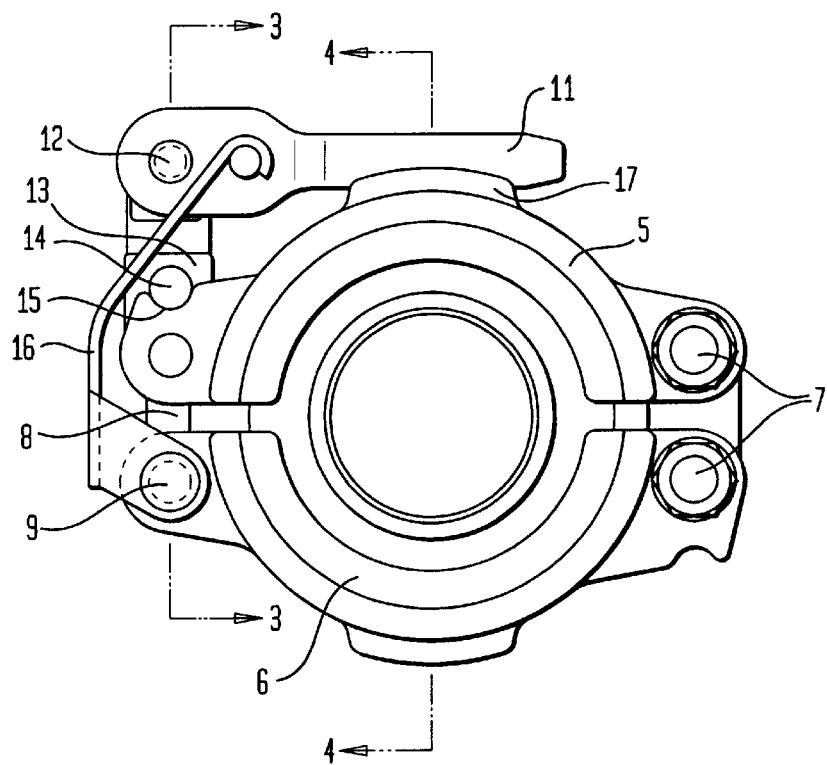
Figure 2:
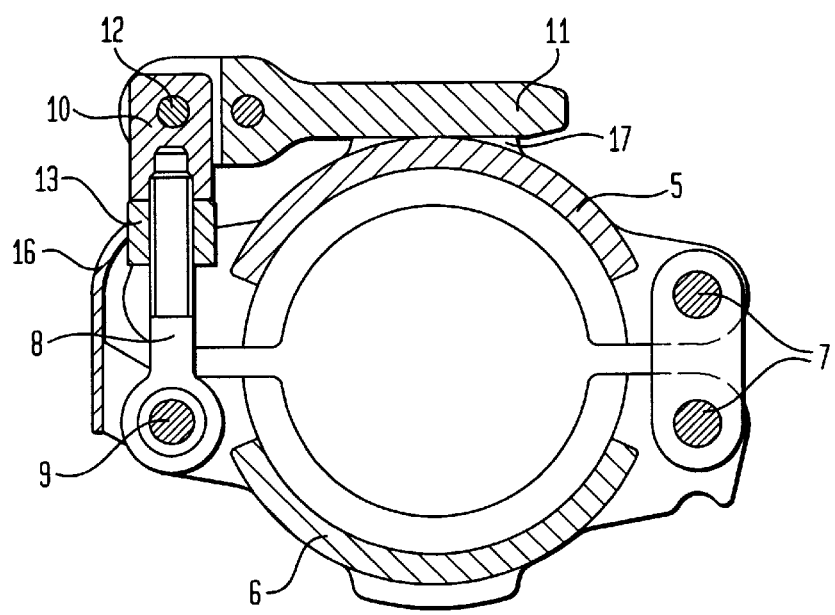
Figure 3:
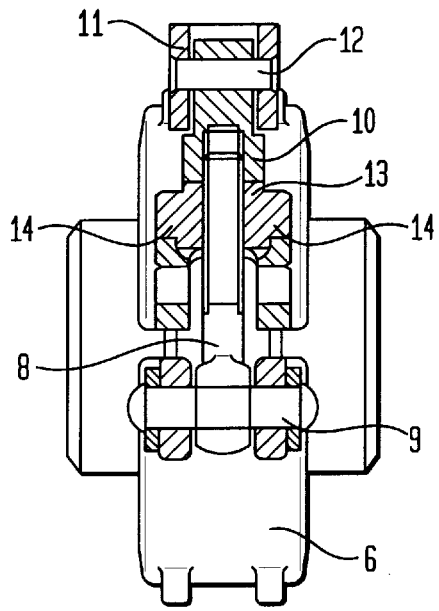

In the drawings like element have like references. Adjacent pipe members 1, 2 to be connected to one another have flanges 3 between which a sealing ring 4 is introduced. The flanges 3 are engaged around by two substantially identically shaped halves 5, 6 of a pipe clamp and are releasably connected to one another by the closure of the pipe clamp.

The clamp halves 5, 6 are pivotably or swivelably connected to one another at their adjacent ends by two screw bolts 7. The bolts 7 can be releasable screw bolts with a secured nut applied thereto, as shown in FIG. 1. Instead of two bolts, only one bolt can also be provided.

Figure 4:
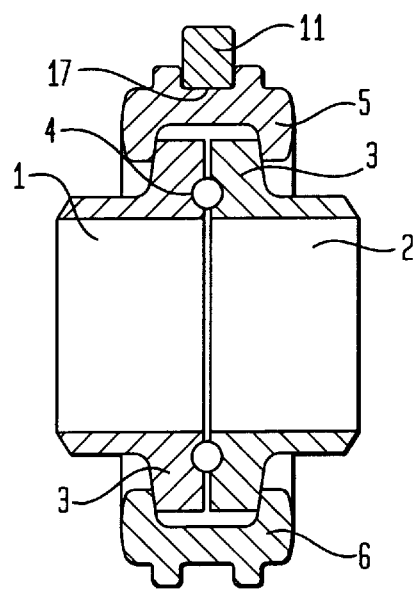
Figure 5:
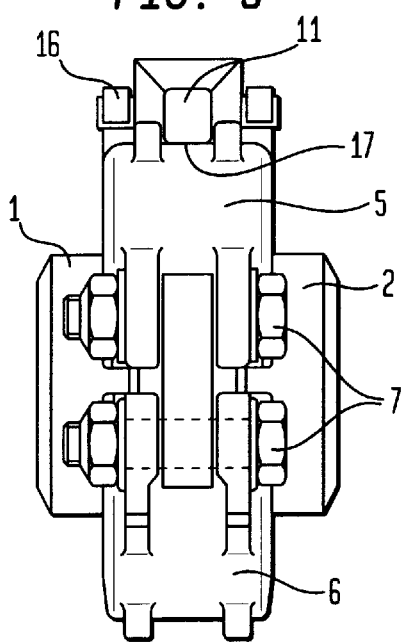
Figure 6:
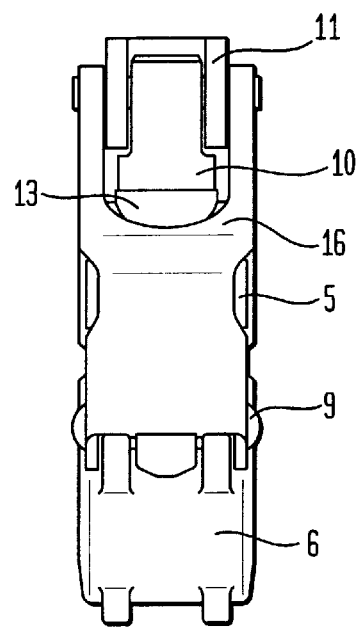

At the other, diametrically opposite end the clamp halves 5, 6 substantially C-shaped in cross section (FIG. 4) are opened or closed by the actuation of a quick action closure. The quick-action closure comprises a screw bolt 8 which is mounted via a bearing pin 9 at the other end of the clamp half 6 to pivot around an axis parallel with the axis of the coupling. A nut 10 is screwed onto the free threaded end of the screw bolt 8. A lever 11 is articulated to the nut 10 by means of a bearing pin 12. The nut 10 co-operates with a sliding member 13 slipped over the threading of the screw bolt 8. The sliding member 13 has two axial pins 14 which extend in opposite directions and which after the clamp halves 5, 6 have been hinged together around the pipe flanges 3 are received in depressions 15 at the other end of the clamp half 5.

The lever 11 can be secured in the closure position lying in a depression 17 on the clamp half 5 by means of a bowed spring 16 articulated to the same bearing pin 9 as the screw bolt 8.

The pipe coupling is closed as follows:

With the rapid closure opened and the clamp halves 5, 6 hinged apart, the pipe coupling is laid around the flanges 3, the clamp halves 5, 6 being hinged together around the bolts 7. Then the screw bolt 8 is pivoted into the vertical position shown in FIG. 1. Thereafter the sliding member 13 is slid over the screw bolt 8 from its free end, until the axial pins 14 are received in the depressions 15 in the clamp half 5. Then the nut 10 is screwed on to the screw bolt 8 by means of the lever 11 articulated to the nut, until the nut comes into contact with the sliding member 13. As the lever 11 is rotated further, pressure is exerted on the other end of the clamp half 5 via the axial pins 14 of the sliding member 13. As a result, the ends of the clamp halves 5, 6 opposite on this side are drawn towards one another. After the closure position has been reached, the lever 11 is introduced into depression 17 on the clamp half 5 and is secured against rotation or pivoting by the latching-in of the bowed spring 16.

Instead of the bowed spring 16, the lever 11 can also be secured to the clamp half 5 by means of a cotter.

What is claimed is:

1. A pipe coupling comprising:
    first and second clamp halves of C-shaped cross-sections;
    at least one bolt which pivotally connects said clamp halves at a first end of each of said clamp halves; and
    a quick-action closure disposed at a second end of said first clamp half diametrically opposite to the first ends of said clamp halves, said quick action closure comprising
        a screw bolt having a first end articulated to said first clamp half,
        pins oriented axially opposite to the screw bolt, the pins resting in depressions shaped so as to receive the pins, the depressions being provided in said second clamp half, a sliding member slipped over the screw bolt and which rests on the axial pins, a nut placed on a second end of the screw bolt which bears against the sliding member and which is adapted to draw said clamp halves into a closed position, a lever articulated to the nut, and a bowed spring articulated to said first clamp half and which locks the lever in the closed position.

2. The pipe coupling according to claim 1 wherein said second clamp half further has a depression adapted to receive the lever in the closed position.

3. The pipe coupling according to claim 1 wherein the screw bolt and the bowed spring are articulated to said first clamp half by a bearing pin.

* * * * *